United States Patent [19]
Pemberton et al.

[11] Patent Number: 5,772,319
[45] Date of Patent: Jun. 30, 1998

[54] MATERIAL LOADER FOR INJECTION MOLDING PRESS

[76] Inventors: Paul A. Pemberton, 303 20th St.; Darren E. Tipton, R.R. #14 Box 1065, both of Bedford, Ind. 47421

[21] Appl. No.: 800,216

[22] Filed: Feb. 12, 1997

[51] Int. Cl.[6] .................................................. B29C 31/02
[52] U.S. Cl. .................... 366/76.2; 366/76.91; 366/143; 366/154.1; 366/158.5; 222/64; 222/159; 222/195; 425/147; 425/173; 425/580; 425/584
[58] Field of Search .............................. 366/76.1, 76.2, 366/76.6, 76.9, 76.91, 76.92, 76.93, 101, 107, 143, 152.6, 154.1, 158.5, 181.1, 181.2, 182.1, 183.1; 425/147, 173, 580, 584, 585; 222/64, 145.1, 185.1, 195, 630, 159, 564, 189.06

[56] References Cited

U.S. PATENT DOCUMENTS

| | | | |
|---|---|---|---|
| 3,194,539 | 7/1965 | Hanne-Wiame | 366/101 X |
| 3,366,282 | 1/1968 | Lucas | 222/195 |
| 3,871,629 | 3/1975 | Hishida | 366/76.2 |
| 4,013,745 | 3/1977 | Brinkmann et al. . | |
| 4,066,245 | 1/1978 | Shultz . | |
| 4,101,613 | 7/1978 | Norwood . | |
| 4,108,334 | 8/1978 | Moller | 222/145.1 X |
| 4,378,897 | 4/1983 | Kattelmann | 222/64 X |
| 4,636,085 | 1/1987 | Kopernicky | 366/76.9 |
| 4,728,475 | 3/1988 | Beck | 366/76.91 X |
| 4,755,061 | 7/1988 | Goins | 366/76.2 |
| 4,756,855 | 7/1988 | Mathis et al. . | |
| 4,792,235 | 12/1988 | Paul . | |
| 4,850,703 | 7/1989 | Hanaoka et al. . | |
| 5,018,868 | 5/1991 | Baillie . | |
| 5,096,302 | 3/1992 | Durina | 366/76.92 |
| 5,110,521 | 5/1992 | Moller . | |
| 5,129,766 | 7/1992 | Dirkse et al. | 222/195 X |
| 5,148,943 | 9/1992 | Moller | 222/64 X |
| 5,213,724 | 5/1993 | Saatkamp | 366/76.91 X |
| 5,253,994 | 10/1993 | Zweig et al. . | |
| 5,282,548 | 2/1994 | Ishihara | 222/64 X |

FOREIGN PATENT DOCUMENTS

| | | | |
|---|---|---|---|
| 538711 | 4/1993 | European Pat. Off. | 425/585 |
| 53-123461 | 10/1978 | Japan | 425/147 |
| 247744 | 2/1926 | United Kingdom | 222/195 |
| 740049 | 11/1955 | United Kingdom | 222/145.1 |

*Primary Examiner*—Charles E. Cooley
*Attorney, Agent, or Firm*—Jacobson, Price, Holman & Stern, PLLC

[57] ABSTRACT

A material loader includes a material hopper, an air filter, a hopper support and a control box. The filter is positioned on top of the hopper, and the hopper is positioned on top of the hopper support. The entire unit is mounted directly over the throat of a plastic injection molding machine and feeds a mixture of virgin and regrind plastic into the machine. The control box, mounted on the side of the plastic injection molding machine, contains timers and other electronic equipment which run the unit to control amount, ratio and timing of conveyance of feed material to the hopper, and ultimately to the press. Two inlet tubes feed plastic into the hopper, one feeding virgin plastic and the other feeding regrind plastic. The control box contains load timers, which may be adjusted manually to control the exact amount of each type of plastic which is fed into the hopper.

6 Claims, 4 Drawing Sheets

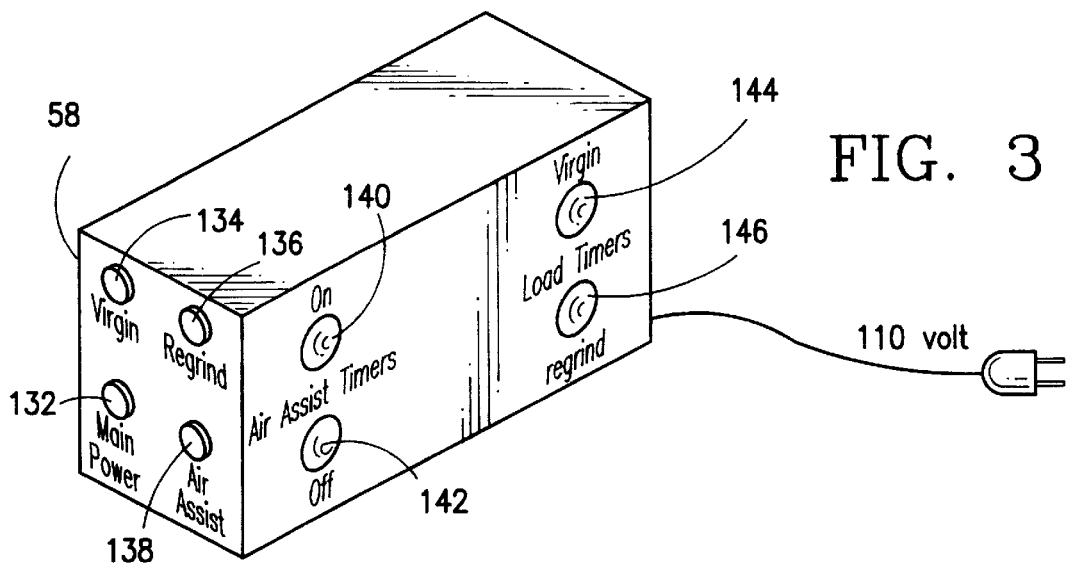
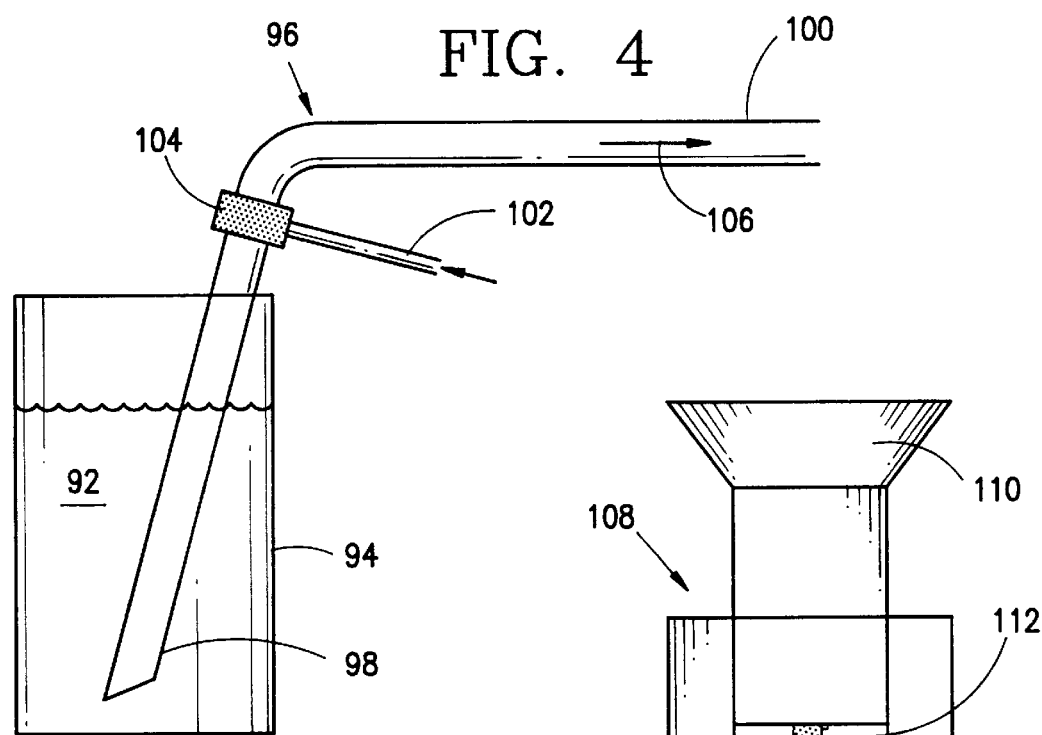
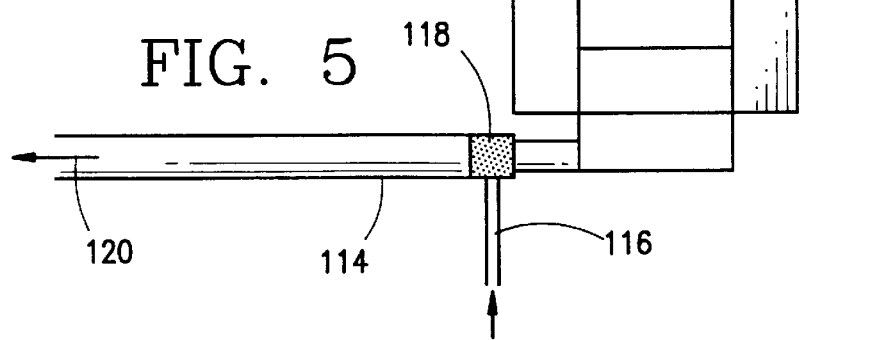

MATERIAL LOADER FOR INJECTION MOLDING PRESS

FIELD OF THE INVENTION

The present invention allows automatic loading of soft polyvinyl chloride (PVC) and other plastic materials to a plastic injection molding press.

BACKGROUND OF THE INVENTION

There are many different types of PVC material loaders for injection molding presses on the market. However, there is a problem with these loaders in that they are unable to provide consistent loading of soft material to an injection molding press. Oftentimes, there is a clogging of a material supply tube due to the softness and compressibility of the feed material. Bridging of the supply material also prevents smooth feed of material to the press.

In addition, difficulty has been encountered in providing a predetermined ratio of virgin to regrind material. This is due to use of a single blast of air to convey two different types of feed material simultaneously.

SUMMARY OF THE INVENTION

By the present invention, the problems of known material loaders have been overcome.

The material loader of the present invention includes a material hopper, an air filter, a hopper support and a control box. The filter is positioned on top of the hopper, and the hopper is positioned on top of the hopper support. This entire unit is mounted directly over the throat of a plastic injection molding machine and feeds a mixture of virgin and regrind plastic into the machine. The control box, mounted on the side of the plastic injection molding machine, contains timers and other electronic equipment which run the unit to control amount, ratio and timing of conveyance of feed material to the hopper, and ultimately to the press.

Two inlet tubes feed plastic material into the hopper, one feeding virgin plastic and the other feeding regrind plastic. The control box contains load timers, which may be adjusted manually, to control the exact amount of each type of plastic which is fed into the hopper.

Bursts of compressed air alternately feed each type of plastic into the hopper for however many seconds the timers are set to feed that type of plastic. For example, having the virgin plastic load timer set for 2 seconds and the regrind plastic load timer set to 1 second will yield a perfect 2:1 ratio of virgin to regrind plastic. This proportional loading design allows for a substantially exact percentage of virgin/regrind plastic to be fed into the hopper.

Once the plastic is fed into the hopper, it drops down into the hopper support and ultimately into the plastic injection molding machine. The hopper support contains two proximity sensors, or electric eyes, which are mounted one above the other. When the level of plastic in the hopper support is above the top proximity sensor, an air assist tube timer is triggered.

The present invention avoids the problems encountered by other loaders for injection molding presses by the use of the air assist tube extending longitudinally through the hopper support which includes a transparent feed sight tube. A plurality of air release holes spaced along the air assist tube agitate feed material surrounding the air assist tube to prevent jamming or bridging over of the feed material.

A one-quarter inch diameter copper tube is used as the air assist tube to get the air to the material. This allows the air to agitate the material for consistent loading, while the copper acts to reduce the static charge that causes the material to adhere to the sight tube and the other material. The air assist tube timer causes the air assist tube to go on and off for a number or fraction of seconds and may be adjusted in the control box.

The compressed air escapes the unit via the filter on the top of the hopper. The deflector plate in the hopper also keeps the material from blowing into the filter from the upward bursts of air from the air assist tube while still allowing the air to escape through the filter to the surrounding environment.

When the level of plastic in the hopper support falls below the bottom proximity sensor, the load timers in the control box are again triggered. Thus, more material is fed into the hopper in the predetermined ratio, and the process repeats itself.

Once the sight tube is full of soft PVC pellets, the air assisted agitation system takes over. Timers in the control box are set to have the air assist tube blow air for 0.1 to 10.0 seconds, then off for 0.1 to 10.0 seconds. This process is repeated as programmed until the sight tube's material level drops from the bottom of the sight tube into the molding press located below the bottom proximity sensor. This process keeps the material moving down through the sight tube and into the press without complication or clogging of material.

This process is continued, air on and air off, until the tube's material level drops below the bottom proximity sensor. At this point the air assisted agitation system halts and the loading system takes over until the sight tube is filled to the top proximity sensor. Then the air assisted agitation system resumes and the process is repeated over and over with a high consistency of error free loading of soft PVC material or pellets.

To start the loading system, the bottom proximity sensor adjacent to the hopper support senses an absence of feed material. This signals the regrind load timer in the control box to start loading of material. The regrind timer starts at a 0.1 to 10.0 second fill rate setting depending on the desired depth of regrind material to be fed into the sight tube of the hopper support. For example, a one-half inch depth of regrind material may be desired to be conveyed to the sight tube.

At the same time a magnetic air valve is opened which supplies 80 psi compressed air to a regrind material accelerator hose. The air pulls the material from the grinder pan and pushes the regrind material up the hose. The compressed air blows regrind material through the hose to one of the hopper inlets. The regrind material then enters the hopper.

The regrind material is directed downwardly, after hitting a deflector plate, into the sight tube which begins to fill. When the regrind timer in the control box times out, the regrind air valve is closed. Therefore, the regrind air valve is only open for the amount of time specified by the regrind timer, which is from 0.1 to 10.0 seconds.

Next, a virgin material timer in the control box starts at a 0.1 to 10.0 second fill rate setting depending on the desired depth of virgin material. For example, if a 2:1 ratio is desired, a one inch depth of virgin material may be added to the sight tube.

This timer opens a magnetic air valve which supplies 80 psi compressed air to an accelerator hose. The accelerator hose would then convey the compressed air and virgin material to the other hopper inlet.

The virgin material would then enter the hopper. The virgin material contacts the deflector plate and is directed downwardly into the sight tube on top of the regrind material. When the virgin timer times out, the virgin air valve is closed. This then triggers the regrind timer to begin it's filling process again.

This cycle continues back and forth from regrind material to virgin material until the sight tube is filled in layers to the top proximity sensor. When the upper proximity sensor senses material, the loading process is stopped and whichever timer is running at the time is stopped.

Then the air assisted agitation system begins. As the injection molding press uses material gravity fed from the sight tube into the throat of the press, the air assist timer will open the air assist valve which supplies 80 psi of compressed air to the air assist tube. The air exits out the holes that open laterally from the air assist tube. The exiting air agitates the material. The released, agitating air flows up and out the filter while causing the material to fall down and fill the press from the sight tube.

The air assist timer allows the air assist valve to be open for 0.1 to 10.0 seconds. When the air assist timer times out (reaches it set amount of time), the air assist valve is closed and the air assist off timer is started. The air assist off timer can be set for 0.1 to 10.0 seconds. Once the air assist off timer times out, the air assist timer begins again.

This process is repeated until the material level in the sight tube drops below the bottom proximity sensor. This low material level triggers the bottom proximity sensor to send a signal to the control box to stop the air assist process and resume the loading process.

The amount of load time will vary from one material to another. A soft material will take longer to load than a hard material. This is because soft material tends to stick to the hoses and tubes as it travels to the hopper. Therefore soft material requires more time and energy to load the same amount of material to the hopper.

If, for example, nylon, a hard material, was being loaded, the load time would be approximately 2.0 seconds. Whereas if, for example, PVC, a soft material, was being loaded, the loading time for the same amount of material would be 4.0 seconds. Even though the two times are different, the same amount of material would be loaded into the hopper.

Alternatively, by knowing the required amount of time to load the same amount of different materials, timers can be set to load a predetermined ratio of different materials. By the present invention, a very exact ratio of materials can be realized due to two separate and alternating compressed air streams and an air assist tube located in the sight tube of the hopper support.

Accordingly, it is an object of the present invention to provide a material loader for an injection molding press having a hopper with two material inlets supported by a hopper support with a collection tube for conveying plastic material from the hopper to an injection molding press.

It is another object of the present invention to provide a material loader for an injection molding press having a hopper supported by a hopper support, including a collection tube for collecting plastic material fed to the hopper and having an air assist tube extending through the collection tube for release of compressed air to agitate the plastic material in the collection tube so as to convey the plastic material from the hopper to the injection molding press.

It is still yet another object of the present invention to provide a material loader for an injection molding press having a hopper supported by a hopper support and a control device for regulating the quantity and timing of delivery of two different plastic materials to the hopper in a predetermined ratio by the use of compressed air for accelerating delivery of the two different plastic materials to two inlet tubes of the hopper so as to convey the plastic material to a collection tube in the hopper support with an air assist tube extending through the collection tube for agitating the collected plastic material upon reaching a predetermined level of plastic material in the collection tube.

It is still yet another object of the present invention to provide a material loader for an injection molding press having a hopper with a deflector plate for deflecting two different plastic materials received through two inlet tubes and for conveyance of the plastic material into a collection tube supporting the hopper so as to pass the collected plastic material into an injection molding press, the plastic material being agitated by an air assist tube passing through the collection tube and the air from the air assist tube escaping from the collection tube into the hopper, and exiting from an air filter supported on top of the hopper.

These an other objects of the invention, as well as many of the intended advantages thereof, will become more readily apparent when reference is made to the following description taken in conjunction with the accompanying drawings.

BRIEF DESCRIPTION OF THE DRAWINGS

FIG. 3 schematically illustrates a control box used for controlling the quantity and time of conveyance of two different plastic materials as well as control of compressed air to an air assist tube.

FIG. 4 schematically illustrates the removal of virgin material from a drum into an accelerator hose as assisted by a source of compressed air for conveyance of the virgin material to an inlet tube of the material loader.

FIG. 5 schematically illustrates the conveyance of regrind material from a grinder to an accelerator hose as assisted by compressed air for conveying the regrind material to another inlet tube of the material loader.

DETAIL OF THE PREFERRED EMBODIMENTS

Figure 1:
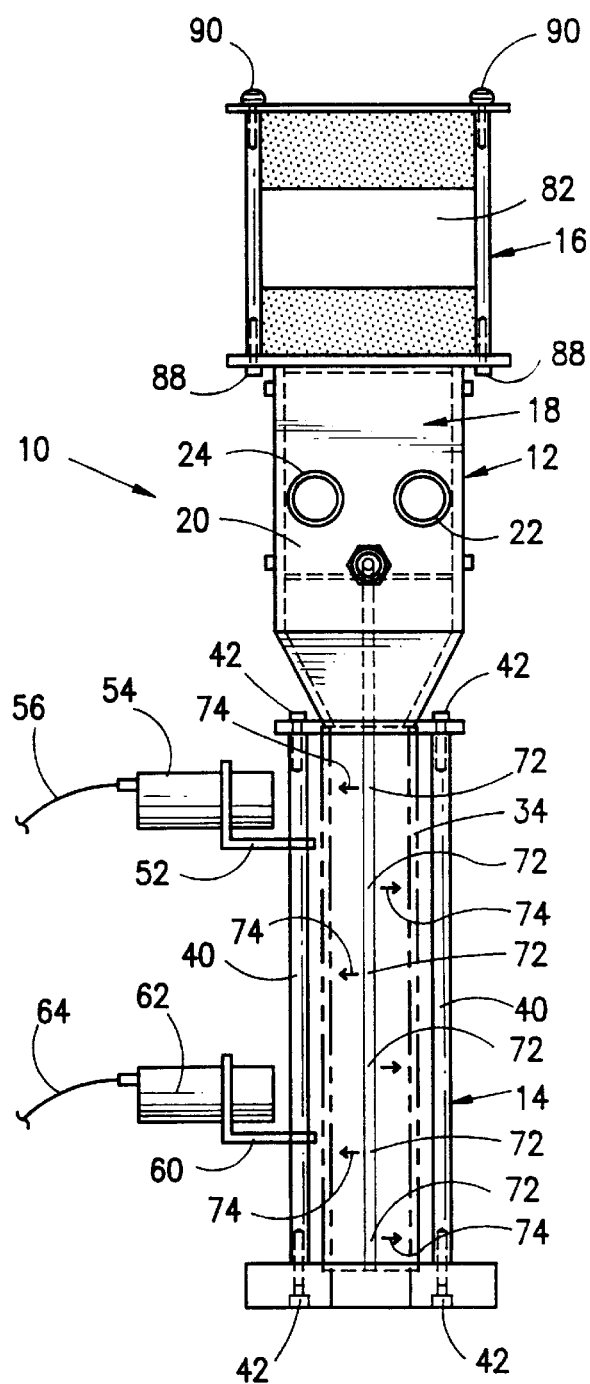
FIG. 1 is a side view of a material loader for an injection molding press in accordance with the principles of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
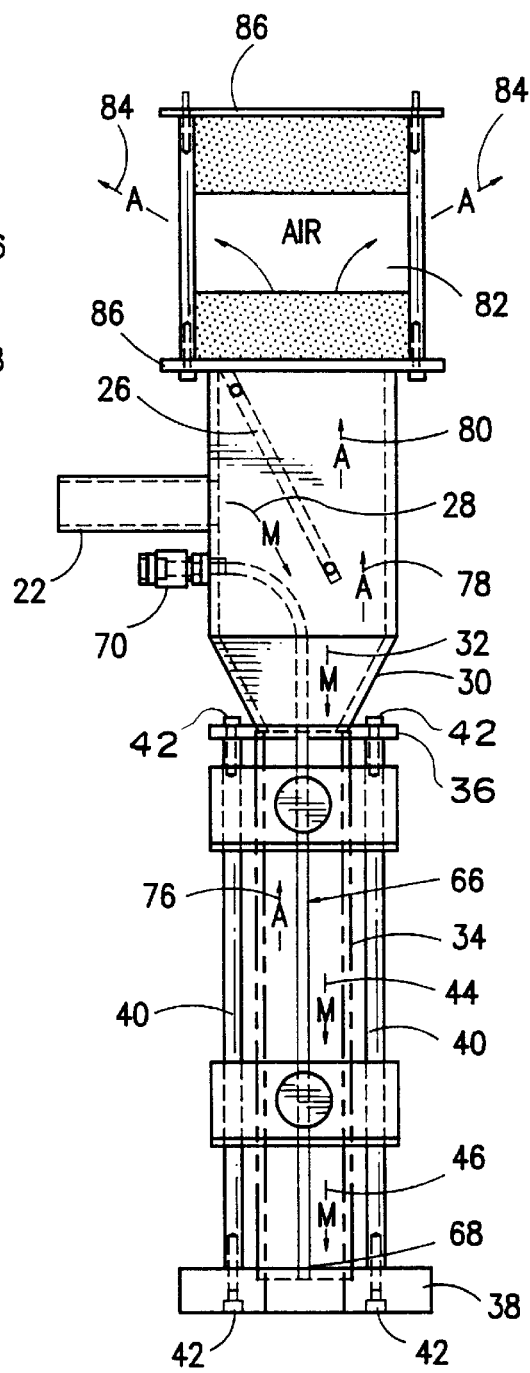
FIG. 2 is a front view of the material loader of the present invention as shown in FIG. 1.

With reference to the drawings, in general, and to FIGS. 1 and 2, in particular, a material loader embodying the teachings of the subject invention is generally designated as 10. With reference to is orientation in FIG. 1, the material loader comprises a hopper 12, supported by a hopper support 14, on top of which is located an air filter 16.

The hopper 12 includes a main compartment 18 having a side wall 20 from which extends a first inlet tube 22 for receipt of virgin plastic material and a second inlet tube 24 for receipt of regrind plastic material. Located within the main compartment 18 is a deflector plate 26 which extends at an angle of approximately 450° with respect to the axes of the two inlet tubes 22, 24.

Plastic material entering through the inlet tubes 22, 24, impinges upon the deflector plate and moves in the direction of arrow 28 down into a bottom portion 30 of the hopper. Portion 30 has inwardly tapering side walls so as to convey the plastic materials in the direction of arrow 32 into collection tube 34.

Figure 6:
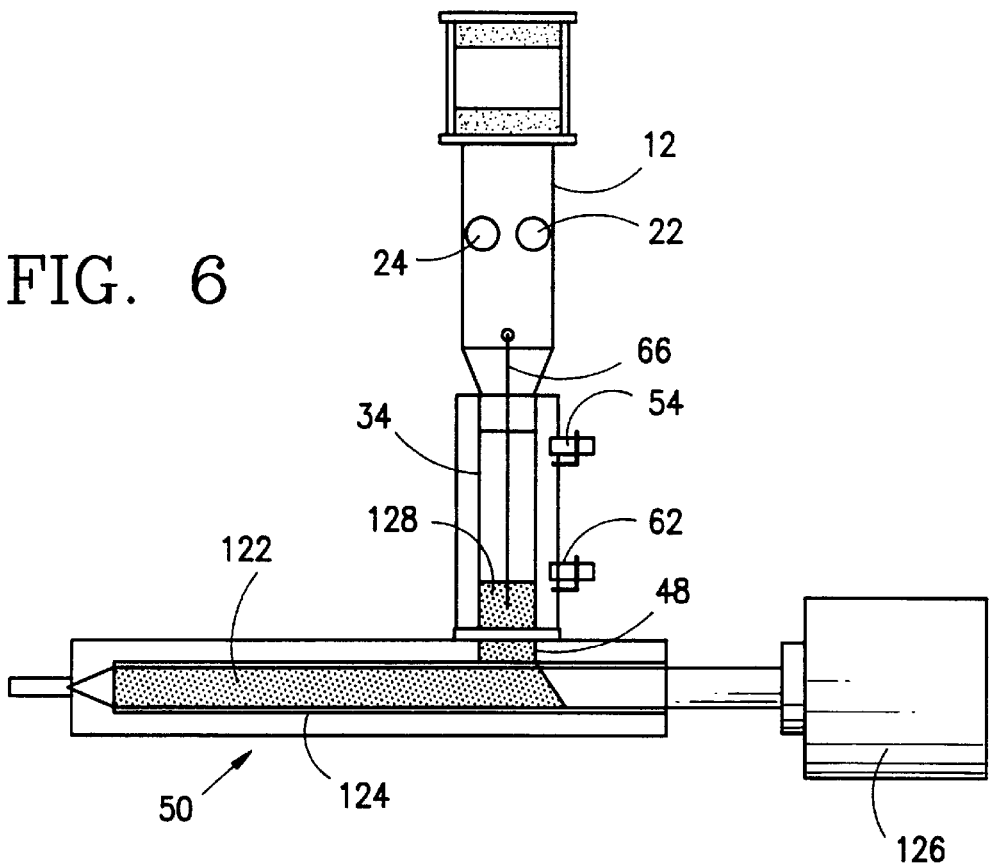
FIG. 6 illustrates the condition in which conveyance of plastic material is initiated to the material loader of the present invention due to the sensing by a proximity sensor of a lower level of plastic material in a collection tube which feeds plastic material to the throat of an injection molding press.
Figure 7:
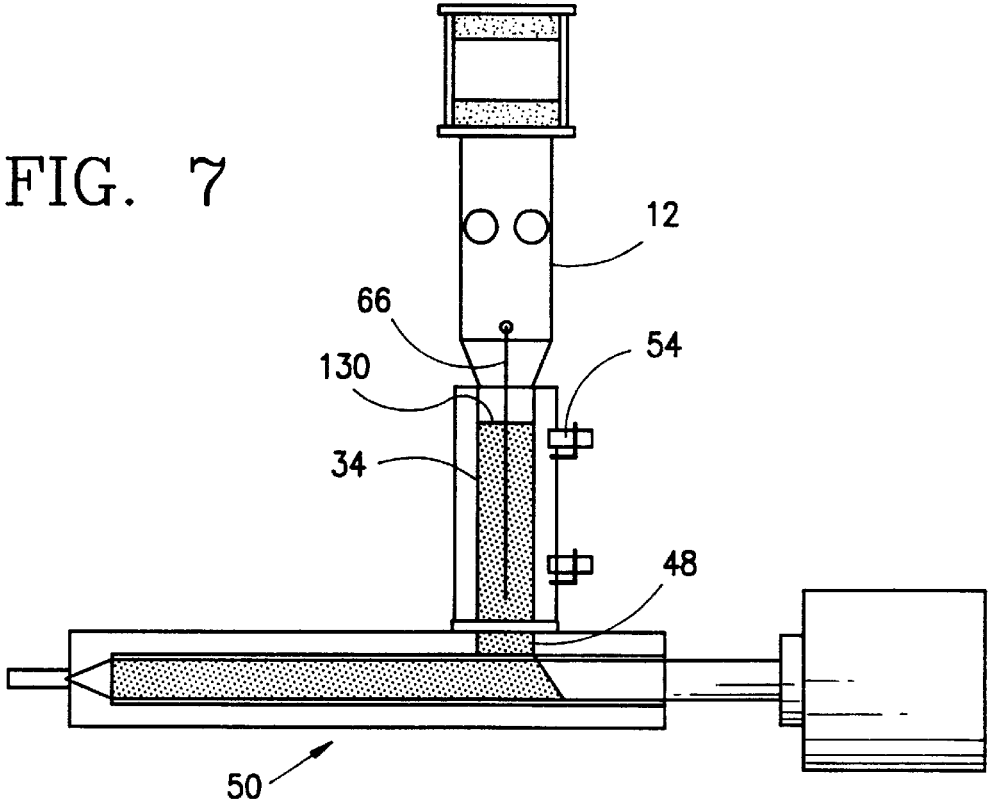
FIG. 7 illustrates a condition in which further conveyance of plastic material to the material loader of the present invention is terminated due to the sensing by a proximity sensor of a filling of a collection tube from which plastic material is fed into an injection molding press.

Collection tube 34 is made of a clear polycarbonate material and is approximately 10 inches long with an outside diameter of 2 inches and an inside diameter of 1¾ inches. The collection tube is supported between hopper support plates 36 and 38 which are interconnected by hopper support rods 40. The ends of the rods 40 are connected to the respective plates 36, 38 by bolts 42. Material fed into the collection tube 34 moves in the direction of arrows 44 and 46 into throat 48 of an injection molding press 50 as shown in FIGS. 6 and 7.

Mounted on the connection rods 40 is a bracket 52 for holding upper proximty sensor 54 connected by electrical signal transmitting wire 56 to a control box 58 which will be described later with reference to FIG. 3. Similarly, a bracket 60 supports a lower proximity sensor 62 which transmits signals by wire 64 to control box 58. Upper and lower proximity sensors 54, 62 detect the presence of plastic material in the collection tube 34.

To assist in the agitation of plastic material in the collection tube 34, an air assist tube 66 extends centrally through the collection tube. One end 68 of the tube terminates at an end of the collection tube 34. The opposite ends passes through portion 30 of hopper 12 and out of a side wall of the hopper 12. The air assist tube terminates at push lock fitting 70 for connection to a source of compressed air.

Spaced along the length of the air assist tube 66 are a plurality of air holes 72 for lateral release of compressed air in the direction of arrows 74 so as to assist in the agitation of plastic material held within the tube 34. Air, after being released into the collection tube 34, passes in the direction of arrow 76, up through the collection tube 34. As indicated by arrows 78 and 80, the air passes the deflector plate 26 in the hopper and through air filter 82 into the surrounding environment as indicated by arrows 84. Air filter 82 is mounted on top of the hopper 12 between support plates 86 and is secured in place in the lower plate by bolts 88 and in the upper plate by thumb screws 90 for release and changing of the air filter 82.

For pickup of the virgin material 92 from drum 94, an accelerator hose 96 has one end 98 immersed in the supply of virgin material 92. The opposite end 100 is connected to inlet tube 22 for supply of virgin material to the hopper 12. To facilitate movement of the virgin material 92 to the hopper 12, a compressed air source connected to pipe 102 forces air through an accelerator coupling 104 into the hose 96 to force virgin material 92 in the direction of arrow 106 and into hopper inlet 22.

Similarly, material grinder 108 conveys material to be ground through funnel feed pipe 110 to a grinder roller 112. The regrind material is conveyed into accelerator hose 114 by the force of compressed air fed from by inlet pipe 116 through an accelerator coupling 118 to move regrind material through hose 114 in the direction of arrow 120 to inlet tube 24 of hopper 12.

As illustrated in FIGS. 6 and 7, the injection molding press 50 continuously draws plastic material through throat 48 into screw converyor 122 as rotated in barrel 124 by motor 126. The level 128 of plastic material in FIG. 6, is below the level of proximity sensor 62. Accordingly, a signal will be provided to control box 58 so as to initiate feeding alternating layers of additional material to the collection tube 34.

With reference to FIG. 7, as the level 130 of plastic material reaches the level of upper proximity sensor 54, a signal will be generated to terminate feeding of additional plastic material layers to the hopper 12. Air assist tube 66 will then be activated to assist in agitation of the plastic material in collection tube 34 so as to ensure that the plastic material is uniformally conveyed to the throat 48 of injection molding press 50.

Plastic material will then be fed into the injection molding press for the next 5 to 6 minutes until reaching the level 128 of plastic material as shown in FIG. 6, at which point the air to air assist tube 66 will be terminated and feeding of batches of plastic material to inlet tubes 22 and 24 will resume.

The control of the timing of feeding of plastic material and air to the components of the material loader of the present invention is controlled by the control box 58. As shown in FIG. 3, power to the control box is controlled by toggle switch 132 whereas initial energization of the virgin material supply hose, regrind material supply hose and air assist tube is provided by toggle switches 134, 136, 138, respectively. Air assist "on" timer and air assist off timer dials 140, 142, respectively, are manually rotatable between settings of 0.1 and 10.0 seconds. Similarly, timer dials 144, 146 provide manual control of alternating time settings for feeding alternating layers of virgin material and regrind material, respectively.

Figure 8:
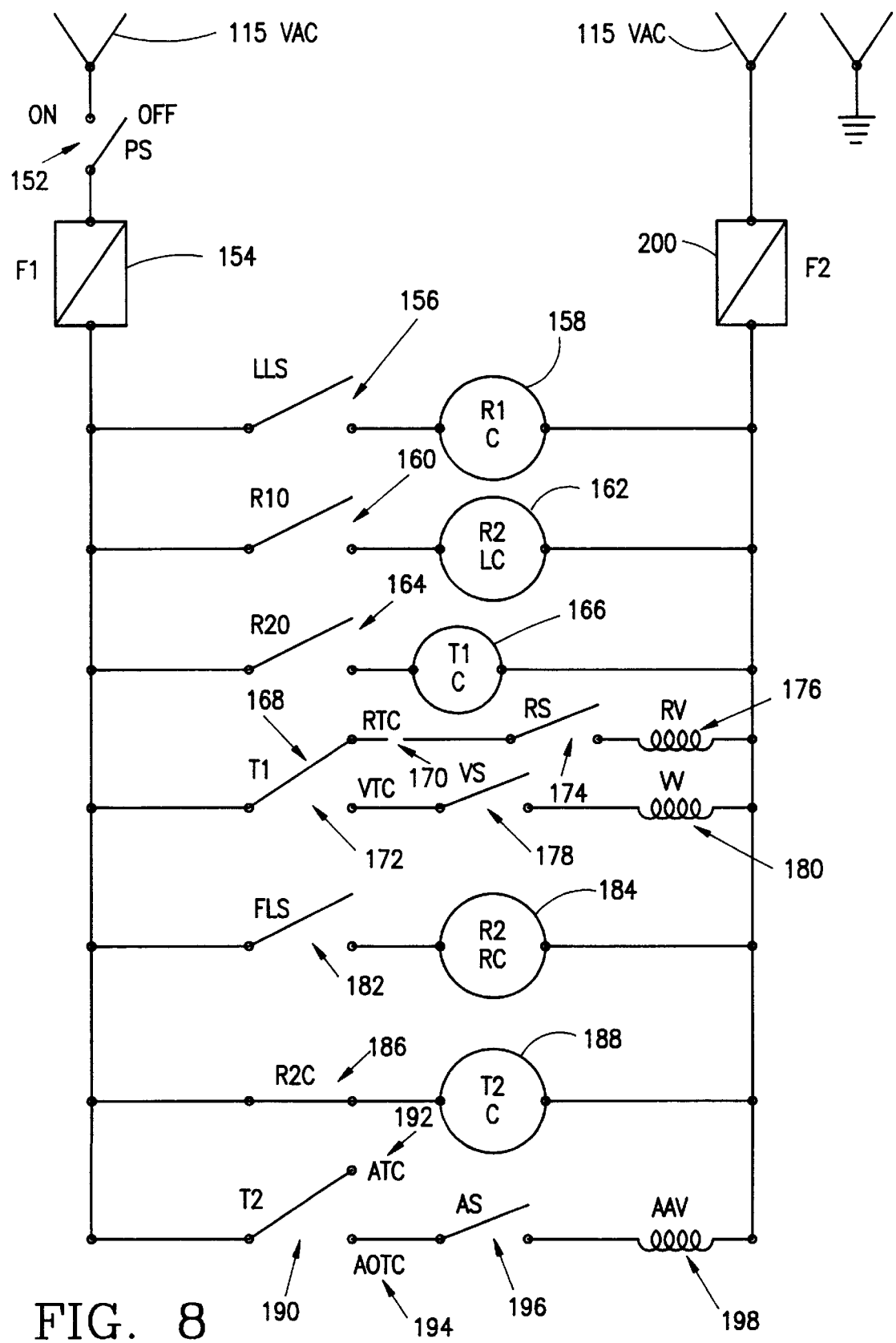
FIG. 8 schematically illustrates a circuit for controlling the timing of conveyance of plastic materials to the material loader of the present invention and control of various compressed air sources for assisting in the conveyance and agitation of plastic materials.

Actuation of the various timing and air assist functions of the material loader is schematically illustrated in FIG. 8. The main power switch 152 is connected to short circuit protection fuse 154. A signal from lower proximity sensor 62 is provided to low level sensor switch 156 which is closed upon an indication of the plastic material falling below the level of the proximity sensor 62. The closing of switch 156 energizes coil 158 of relay 1. The closing of normally open contacts 160 of relay 1 causes energization of the latch coil 162 of relay 2. Closing of the normally open contacts 164 of relay 2 energizes the coil 166 for the load timers of the virgin material or regrind material. The timer 1 contacts 168 are switchable between the regrind contacts 170 of timer 1 for the regrind material and the virgin material contacts 172 of timer 1 for the virgin material, and respectively for connecting the regrind material on/off switch 174 connected to regrind air valve control 176 and virgin material on/off switch 178 connected to virgin material air valve control 180.

A signal from upper proximity sensor 74 causes actuation of full level sensor switch 182, which is connected to reset coil 184 of relay 2. The normally closed contacts 186 of relay 2 are connected to coil 188 of the air assist timer. The timer 2 contacts 190 switches between the air assist "off" timer contacts 192 and the air assist "on" timer contacts 194 which is further connected to the air assist on/off switch 196 and the air assist air valve control 198. A second fuse 200 provides reverse plurality protection.

The timers and general purpose relays are available as part numbers 7630K12 and 7170K3, respectively, from McMaster-CARR of Chicago, Ill. The latch relays are available as part number KUL11A15S-120 from Resource Electronics. The proximity sensors are available as part number 973CP15TP-A11T-L from Kirby Risk Supply Company of Bedford, Ind. and the loader air valves and air assist air valve are available as part numbers 2F985 and 2G451, respectively, from Grainger of Evansville, Ind.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A loading system for feeding plastic material to an injection molding machine, said loading system comprising:

a hopper having two inlets for receiving two different plastic materials, a hopper support having a collection tube for receiving plastic material from said hopper at one end and for dispensing plastic material to an injection molding machine at an opposite end, an air assist tube extending through said collection tube and including a plurality of holes for releasing air into plastic material collected in said collection tube so as to agitate the plastic material for flow into the injection molding machine, and a control device for regulating timing and sequence of conveyance of plastic materials to said two inlets and release of air from said air assist tube.

2. A loading system as claimed in claim 1, wherein two proximity sensors positioned adjacent to said collection tube provide a signal to said control device dependent on the presence or absence of plastic material in said collection tube at different locations in said collection tube.

3. A loading system as claimed in claim 1, wherein said control device regulates an amount of plastic material to be fed to said two inlets in a predetermined ratio of material required to be dispensed to the injection molding machine.

4. A loading system as claimed in claim 1, wherein said hopper includes a deflector plate for directing plastic material to said collection tube.

5. A loading system as claimed in claim 1, wherein said collection tube is transparent for viewing plastic material collected therein.

6. A loading system as claimed in claim 1, wherein an air filter is mounted on said hopper.

\* \* \* \* \*